United States Patent [19]

Müller et al.

[11] Patent Number: 4,543,111
[45] Date of Patent: Sep. 24, 1985

[54] DUST SEPARATOR

[75] Inventors: Josef Müller; Johannes Wunder, both of Eisenerz, Austria

[73] Assignee: Voest-Alpine Aktiengesellschaft, Vienna, Austria

[21] Appl. No.: 497,678

[22] Filed: May 24, 1983

[30] Foreign Application Priority Data

Jun. 22, 1982 [AT] Austria .................. 2416/82

[51] Int. Cl.⁴ ........................................... B01D 47/00
[52] U.S. Cl. ...................................... 55/230; 55/236; 55/238; 261/90
[58] Field of Search ................. 55/84, 230, 235–238; 261/89, 90

[56] References Cited

U.S. PATENT DOCUMENTS

| 1,218,354 | 3/1917 | Baldwin | 261/90 |
| 1,292,125 | 1/1919 | Stevens | 261/89 |
| 1,778,426 | 10/1930 | McKee | 261/89 |
| 3,173,771 | 3/1965 | Banetf et al. | 55/238 X |
| 4,145,197 | 3/1979 | Strahsner | 55/230 X |

FOREIGN PATENT DOCUMENTS 0022131 of 1901 United Kingdom .................. 55/230

Primary Examiner—Charles Hart
Attorney, Agent, or Firm—Cushman, Darby & Cushman

[57] ABSTRACT

The dust separator comprises a rotating centrifugal separator (10) having within a stationary housing paddle wheels (5) equipped with radially extending paddles (12) approximately located in axial planes. With these paddles (12) there are co-rotating walls (9) extending in circumferential direction and adjoining the paddles (12). Blowers (6,7 and 8) force the dust-loaden air through the centrifugal separator and spraying or atomizing means (1) are provided which are arranged as seen in flow direction upstream of the centrifugal separator. The walls (9) extending in circumferential direction have a diameter step-wisely decreasing in flow direction, noting that at the base of each stage there is provided at least one slotted passage (15) extending in circumferential direction.

13 Claims, 5 Drawing Figures

DUST SEPARATOR

The invention refers to a dust separator, in particular for mine ventilation, comprising a rotating centrifugal separator having at least one paddle wheel rotating within a stationary housing and being equipped with radially extending paddles approximately located in axial planes and adjoining with their outer ends to and preferably being welded to co-rotating walls extending in circumferential direction and further comprising blowers for supplying the air stream through the centrifugal separator and at least one spraying or atomizing means, arranged as seen in flow direction of the air upstream of the centifugal separator, for spraying or atomizing water being supplied to the air stream entering the centrifugal separator. In such a dust separator, the dust particles are loaded in the streaming air by the sprayed or atomized water. Within the centrifugal separator, the air charged with the dust particles is entailed a rotating movement and the dust particles loaded with water are thrown in outward direction. Such a dust separator has become known for example from AT-PS 366 780. According to this patent specification, two centrifugal separator stages equipped with paddle wheels are connected in series in axial direction. A wall extending in circumferential direction and increasing in diameter in flow direction of the air is connected with the outer ends of the paddles of each separator stage. At the area of the greatest diameter of each separator stage there is provided a slotted opening through which the water together with the dust particles is thrown into the space of the housing surrounding the centrifugal separator. The water loaded with dust particles must thus travel over a comparatively long axial path along the conically enlarging wall until it arrives at the exit slot and is thrown out. This detracts from the efficiency of the centrifugal separator. For achieving, in spite of this fact, a separating action, the paddle wheel must comprise a comparatively great number of paddles for allowing the dust-loaden water particles to migrate in outward direction along the paddles, but this great number of paddles increases the through-put resistance through the centrifuge thus detracting from the efficiency of the centrifuge.

It is an object of the invention to improve the separating efficiency of the centrifuge of a dust separator and the invention essentially consists in that the walls extending in circumferential direction have a diameter step-wisely decreasing in flow direction, the steps delimiting outwardly extending annular spaces, in that at the base of each stage there is provided at least one slotted passage extending in circumferential direction, in that the axial length of aa stage is maximally $\frac{1}{4}$, preferably $\frac{1}{8}$ to 1/10, of the length of the centrifugal separator and in that the conveying action of the blower arranged at the exit end of the centrifugal separator and preferably designed as a plural-stage radial blower is assisted by an axial blower arranged at the inlet end of the centrifugal separator. In view of the axial length of one stage being very small as compared with the length of the whole centrifugal separator and in view of a slotted passage being provided at the base of each stage, the axial path to be covered by the water droplets until emerging from the slotted passage is reduced to a minimum. With a given length of the centrifugal separator the separating effect is thus improved. In view of the diameter of the walls extending in circumferential direction decreasing from stage to stage, the edge of each considered subsequent stage is, seen in axial direction, protruding in inward direction over the edge of the previous stage and is therefore acted upon by the air stream so that the water droplets travel into the annular spaces delimited by the stages and are discharged via the sloted passages. In view of the transport action of the radial blower arranged at the exit end of the centrifugal separator being assisted by an axial blower arranged at the inlet end of the centrifugal separator, the flow velocity is to a great extent made more uniform over the whole length of the centrifuge and this is particularly true if the axial blower arranged at the inlet end is designed such that it compensates flow losses which would occur at the inlet end by arranging only the radial blower at the exit end.

According to the invention, the walls extending in circumferential direction are, seen in an axial section, preferably stepped like saw teeth, the steep flanks of the stages facing the air stream and including at their side facing the air stream an angle of at least 90 degrees with the axis and the slots extending in circumferential direction being contiguous with the steep flanks of the stages. Thus, the effect of subjecting the edges of the stages for discharging the water droplets is favoured. If the steep flanks of the stages perpendicularly extend relative to the axis, they are impinged in perpendicular direction by the water droplets thrown in outward direction. If the angle included between the axis and the front side of the flanks of the stages is somewhat greater than 90 degrees, a flow component in direction to the slotted passages being contiguous at the base of the stage is produced and the water droplets are forcibly moved in direction to these slotted passages. In this case, the less inclined flanks of the stages are conically designed with a diameter increasing in flow direction so that there is formed a flow directed to the slotted passages.

According to a preferred embodiment of the invention, the walls extending in circumferential direction are composed of rings delimiting the outwardly extending annular spaces and the slotted passages extending in circumferential direction and having their internal diameter decreasing from stage to stage and in flow direction of the air. This results in a constructionally simple design. The individual rings can be welded to the outer rings of the paddles and thus be combined with the impeller to form a modular unit. In this case, the arrangement is preferably such that the rings are conical at their inner and at their outer side and have a diameter increasing in flow direction, in that that end of the ring which has the greater diameter overlaps that end of the subsequent ring which has the smaller diameter, in that that end of the ring which has the smaller diameter is enlarged by an outwardly protruding annular rib and has a front surface extending approximately in vertical direction relative to the axis and in that the slotted passages extending in circumferential direction are delimited by the annular rib and the overlapping ring part. Thus, conical slotted passages are provided which extend outwardly as seen in flow direction and thus occupy a favourable position with respect to fluid techniques. The outwardly extending annular rib results in a rim of hook-like cross-section. In view of this rim being overlapped by the preceding ring, water droplets are reliably prevented from returning from the outside into the interior space of the centrifuge.

According to a preferred embodiment of the invention the arrangement is such that the length of the stages is about 8–9% of the mean diameter of the walls extending in circumferential direction and that the diameter of these walls is decreasing from stage to stage by approximately 1%. The cone angle according to which the diameter of the walls extending in circumferential direction is decreasing in flow direction is thus very small. The number of stages is comparatively high so that in all axial areas of the centrifuge essentially the same flow conditions are encountered. In this case, the axial length of the walls extending in circumferential direction is, according to the invention, at least 50%, preferably about 70%, of the mean diameter of said walls. In view of the well uniform flow conditions, this axial dimension of the centrifuge is sufficient for separating the water droplets charged with dust particles from the air so that a complete dust removal can be obtained with a comparatively compact design.

According to the invention, the paddle wheel has only two to five, preferably three, paddles. As compared with known centrifuges having a high number of paddles, flow losses of the air flowing through the centrifuge are thus substantially reduced. Such a reduction of the number of paddles is possible in view of the good removal of the water on account of the high number of stages and slotted passages within the walls extending in circumferential direction.

According to a further preferred embodiment of the invention, the rotating walls extending in circumferential direction are surrounded by a stationary distrubitor comprising baffles outwardly and forwardly inclined in the sense of rotation of the centrifuge. The water emerging in direction of the conically extending slotted passages is collected by this distributor and dripping back of the water into the interior of the centrifuge is reliably prevented. The dust-loaden water collected by the distrubitor flows from the distrubitor to a sump within the housing from where it is sucked off.

According to the invention, the exit end of the centrifuge is conveniently sealed relative to the stationary housing by means of a labyrinth seal having its cylindrical labyrinth gap, which is opening into the interior space of the centifuge, directed in opposite direction to the flow direction. This labyrinth seal seals the interior space of the centrifuge against the surrounding housing. In view of the labyrinth gap opening into the interior space of the centrifuge being directed in opposite direction to the flow direction, the pressure acting on this annular gap is increased by the fluid flow. Any fluid flow out of the space of the housing and through the labyrinth in direction to the interior space of the centrifuge is thus prevented thus also reliably preventing that humidity enters the air leaving the centrifuge. Only dry air will thus emerge behind the centrifuge.

According to the invention the arrangement is conveniently such that the paddles of the centrifugal separator and the blowers are, in a manner known per se, arranged on a common shaft and that the angle, which include the paddles of the radial blower connected to the centrifugal separator at their entry edge with the tangent, is increased, for example to 45–55 degrees, relative to the entry angle usual with resting air. In view of the rotation of the paddle wheel of the centrifuge, the air emerging from the centrifuge enters the axial blower with some twist and this is taken in consideration by increasing the angle of the blower paddles at the entry edge. Such an increase has, however, certain limits and therefore the paddles have, according to an advantageous embodiment of the invention, at the exit end a directional zone curved in opposite direction to the sense of rotation so that the twist of the air emerging from the centrifuge is reduced. The paddles of the centrifuge may have at the entry end a directional zone forwardly curved in the sense of rotation. This has as an effect that the airstream entering the centrifuge from the preceding axial blower is to a great extent given an axial direction. In this case, the design is conveniently such that the axial extension of the directional zones is increasing from the inside in direction to the outside so that there result in all radial areas approximately the same flow conditions.

In the drawing the invention is schematically illustrated with reference to an embodiment.

IN THE DRAWING

FIG. 3 shows an axially extending partial section through the rotating and circumferentially extending wall of the centrifuge.

Figure 1:
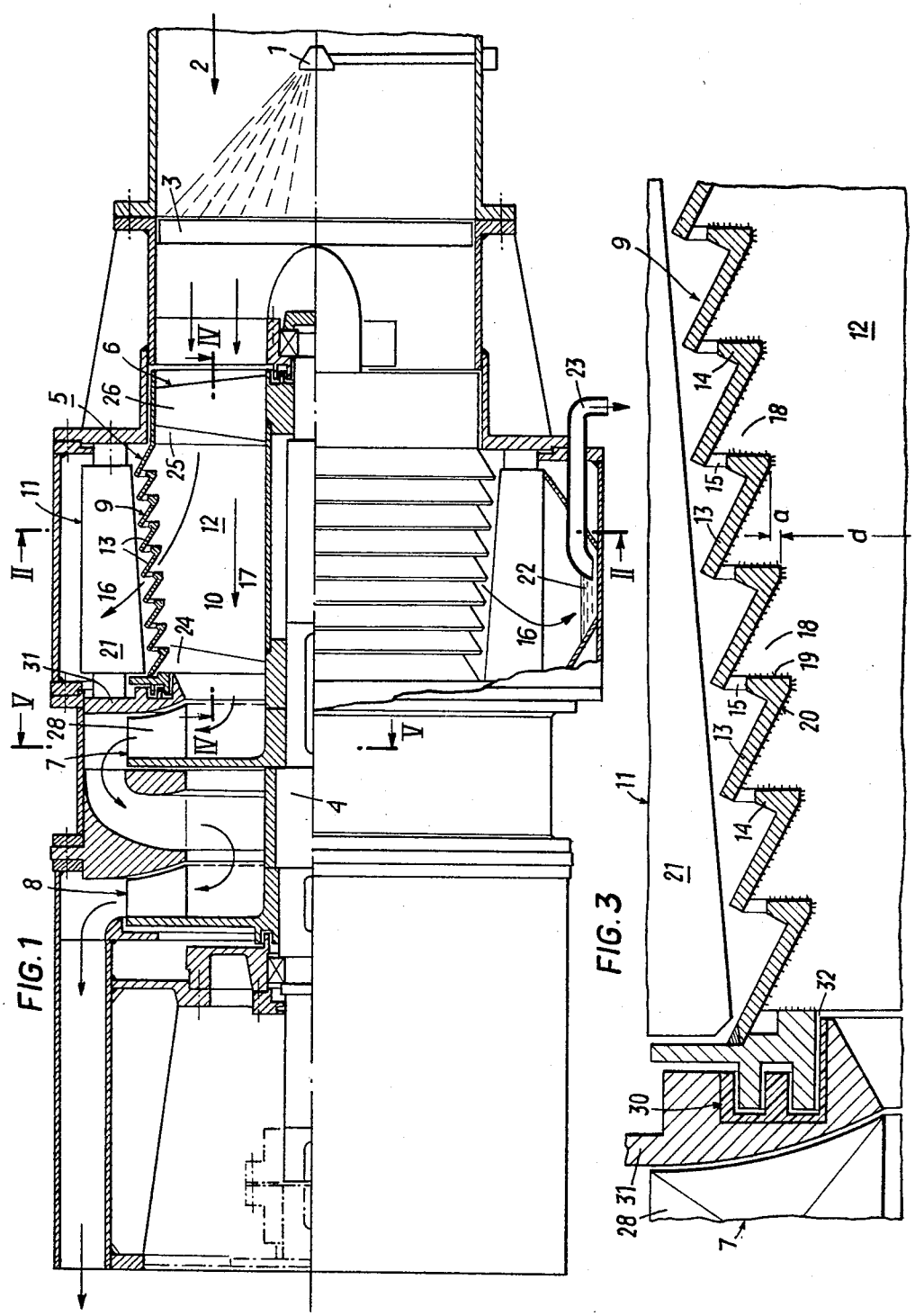
FIG. 1 shows an axial section through the dust separator.
Figure 2:
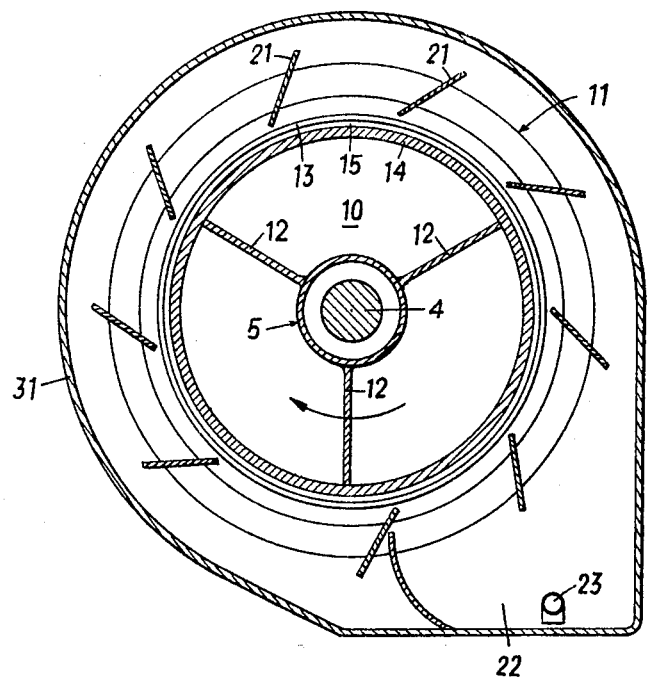
FIG. 2 shows a section along line II of FIG. 1.

In FIG. 1, reference numeral 1 represents a nozzle by which is sprayed water. The air is entering in direction of arrow 2. 3 is a mat which is, for example, formed by superpositioned expanded metal and which results in a better turbulent mixing of the air with the sprayed water.

On a common shaft 4 there is secured against rotation the paddle wheel 5 of the centrifuge, an axial blower 6 preceding the paddle wheel 5 and a radial blower having two stages 7 and 8. The walls extending in circumferential direction and being rigidly connected with the paddles 12 of the centrifuge are designated 9. A distributor surrounding these walls is designated 11. In FIG. 3, the walls 9 are shown in an axial section and on an enlarged scale.

Air is sucked through the interior space of the centrifuge 10 by the two-step radial blower 7, 8 and the flow of air is assisted by the radial blower 6 pressing the air into the centrifuge.

The walls 9 consist of individual conical rings 13 which are welded with the paddles 12 of the centrifuge and are overlapping one another. The rings 13 have at their end showing the smallest diameter outwardly projecting annular ribs 14. The enlarged end of the rings 13 overlaps these annular ribs 14 and between the annular ribs 14 and the preceding rings exists in any case a slotted passage 15. By the centrifugal action the water droplets charged with dust are radially thrown in outward direction, as is indicated by an arrow 16, while the substantially dry air is axially flowing in direction of the arrow 17. The rings 13 are arranged in a step-like manner and the internal diameter of these rings is decreasing from stage to stage by the unit a, the magnitude of which is approximately 1% of the mean internal diameter d of the walls 9 extending in circumferential direction. Between the individual rings there are provided outwardly extending hollow spaces 18 which are delimited by the steep flanks 19 and the less inclined flanks 20 of the rings 13. The steep flank 19 extends in perpendicular direction relaive to the axis 4. The outwardly thrown dust-charged water droplets thus flow along the less inclined flanks 20 of the rings 13 and hit the steep flanks 19 and are thus deviated into the slotted passages 15.

In view of the rings 13 overlapping the annular ribs 14, any dropping back of the water into the interior space of the centrifuge 10 is counteracted. By the ribs 14 the rings 13 are given a hook-like cross-section which prevents the water from flowing back into the centrifuge. The distributor 11 has baffles 21 which are outwardly and forwardly inclined in the sense of rotation of the paddle wheel. Furthermore, the water emerging through the slotted passages 15 is collected by the baffles of the distributor and flows into a sump 22 from where the water is sucked off via a conduit 23 by means of a pump.

Figure 4:
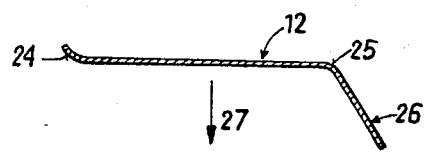
FIG. 4 shows a section along line IV—IV through a paddle of the paddle wheel.
Figure 5:
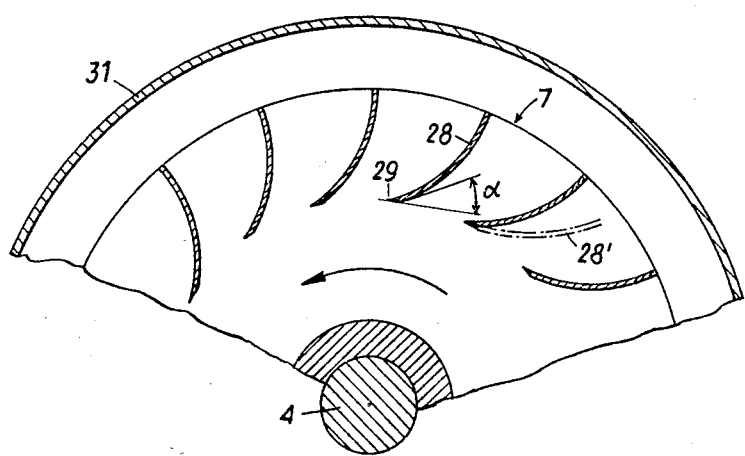
FIG. 5 shows a section along line V—V through the impeller of the radial blower.

The paddles 12 of the paddle wheel 5 have at their exit end a curved directional zone 24 and at their entry end a curved directional zone 25, as is shown in FIG. 4. 26 is a schematic representation of a section through a paddle of the radial blower 6. The directional zone 25 is forwardly curved in the sense of rotation indicated by the arrow 27 and has thus the effect that it deflects the incoming air into axial direction. The directional zone 24 at the exit end is curved in opposite direction to the sense of rotation 27 and is thus reducing the twist of the emerging air. However, the air still arrives at the paddles 28 of the axial blower 7 with a certain twist and the entry edges 29 are therefore adjusted to include a steeper angle α relative to the tangent than would be required when sucking resting air. The position of the paddles which would be required when sucking resting air is shown in dashed lines and designated 28'.

The walls 9 of the centrifuge are sealed against the housing 31 surrounding the centrifuge by means of a labyrinth seal 30. The cylindrical labyrinth gap 32 opening into the interior space of the centrifuge is directed in opposite direction to the flow direction (arrow 17) of the air so that the pressure within this annular gap is increased and any return of humid air from the housing 31 and the distributor 11, respectively, is reliably prevented.

We claim:

1. Dust separator, in particular for mine ventilation, comprising a rotating centrifugal separator having at least one paddle wheel rotating within a stationary housing and equipped with a plurality of stages formed by radially extending paddles approximately located in axial planes and connected with their outer ends to co-rotating walls extending in circumferential direction, which walls, seen in axial section, are stepped like saw teeth, the steep flanks of the stages facing the air stream and including at their side facing the air stream an angle of at least 90 degrees with the axis and slots, between stages extending in circumferential direction and being contiguous with the steep flanks of the stages and the less inclined flanks of the stages being conical with a diameter increasing in flow direction, and further comprising at least one blower for supplying the air stream through the centrifugal separator and at least one spraying or atomizing means, arranged as seen in flow direction of the air upstream of the centrifugal separator, for spraying or atomizing water being supplied to the air stream entering the centrifugal separator, characterized in that the diameters of the stages stepped like saw teeth decrease in flow direction of the air from stage to stage, in that the axial length of each stage is maximally ¼ of the length of the centrifugal separator and in that the conveying action of a blower arranged at the exit end of the centrifugal separator is assisted by an axial blower arranged at the inlet end of the centrifugal separator.

2. Dust separator as in claim 1, wherein that the walls extending in circumferential direction are composed of conical rings welded to the paddles and delimiting outwardly extending annular spaces, the slots having the internal diameter decreasing from stage to stage and in flow direction of the air.

3. Dust separator as in claim 2 wherein the rings are conical at their inner and at their outer side and have a diameter increasing in flow direction, wherein the ring which has the greater diameter overlaps that end of the subsequent ring which has the smaller diameter, wherein that end of the ring which has the smaller diameter is enlarged by an outwardly protruding annular rib and has a front surface extending approximately in vertical direction relative to the axis and wherein the slots extending in circumferential direction are delimited by the annular rib and the overlapping ring part.

4. Dust separator as in claim 1 wherein the length of the stages is about 8–9% of the mean diameter of the walls which extend in circumferential direction and wherein the diameter of the stages decreases from stage to stage by approximately 1%.

5. Dust separator as in claim 1 wherein the entire axial length of the walls which extend in circumferential direction is at least 50% of the mean diameter of said walls.

6. Dust separator as in claim 1 wherein the paddle wheel has two to five paddles.

7. Dust separator as in claim 1 wherein the walls which extend in circumferential direction are surrounded by a stationary distributor comprising baffles outwardly and forwardly inclined in the sense of rotation of the centrifuge.

8. Dust separator as in claim 1 wherein the exit end of the centrifugal separator is sealed relative to the stationary housing by means of a labyrinth seal having a cylindrical labyrinth gap which opens into the interior space of the centrifugal separator, and which is directed in opposite direction to the flow direction.

9. Dust separator as in claim 1 wherein the paddles have at the exit end a directional zone curved in opposite direction to the sense of rotation and at the entry end a directional zone forwardly curved in the sense of rotation.

10. Dust separator as in claim 9 wherein in the axial extension of the directional zones increases from the inside in direction to the outside.

11. Dust separator as in claim 1 wherein the paddles and the blowers are arranged on a common shaft and wherein the angle, which include the paddles of the blower at the exit end of the centrifugal separator are connected to the centrifugal separator at their entry edge with the tangent, is increased, to 44–55 degrees, relative to the entry angle usual with resting air.

12. Dust separator as in claim 1 wherein the axial length of each stage is maximally ⅛ to 1/10 of the length of the centrifugal separator.

13. Dust separator as in claim 1 wherein the blower at the exit end of the centrifugal separator is a plural-stage radial blower.

* * * * *